United States Patent
Hwang

(10) Patent No.: US 7,306,208 B2
(45) Date of Patent: Dec. 11, 2007

(54) VEHICLE ROLL-ROD

(75) Inventor: Dong-Jin Hwang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 373 days.

(21) Appl. No.: 10/983,543

(22) Filed: Nov. 8, 2004

(65) Prior Publication Data

US 2005/0098974 A1    May 12, 2005

(30) Foreign Application Priority Data

Nov. 7, 2003    (KR)    ............... 10-2003-0078671

(51) Int. Cl.
*F16F 5/00*    (2006.01)
(52) U.S. Cl. .................. 267/140.13; 267/140.12; 267/293; 267/141.5
(58) Field of Classification Search ........... 267/140.12, 267/293, 140.13, 141.1, 141.2, 141.5; 180/300, 180/312

See application file for complete search history.

(56) References Cited

U.S. PATENT DOCUMENTS

| | | | | |
|---|---|---|---|---|
| 3,552,785 A | * | 1/1971 | Kornblum et al. | 403/197 |
| 4,518,058 A | * | 5/1985 | Fister et al. | 180/300 |
| 4,706,946 A | * | 11/1987 | Thorn et al. | 267/292 |
| 5,273,261 A | * | 12/1993 | Hamberg et al. | 267/140.12 |
| 5,374,038 A | * | 12/1994 | Hein | 267/140.5 |
| 6,070,862 A | * | 6/2000 | Miyamoto | 267/140.12 |
| 6,729,430 B2 | * | 5/2004 | Adams et al. | 180/300 |

FOREIGN PATENT DOCUMENTS

| | | | |
|---|---|---|---|
| JP | 2000-193003 | | 7/2000 |
| KR | 2002-0055029 | * | 7/2002 |

* cited by examiner

*Primary Examiner*—Bradley King
(74) *Attorney, Agent, or Firm*—Morgan Lewis & Bockius LLP

(57) ABSTRACT

A vehicle roll-rod includes a front insulator, rear insulator, rod, front stopper, rear stopper, and middle stopper. The roll-rod restrains and attenuates rolling of relatively small movements occurring during driving. The vehicle roll-rod also restrains and attenuates rolling of large movements occurring in the event of a force of impact and vibration during rapid accelerations, sudden stops, or turning on/off the ignition key of the engine.

6 Claims, 5 Drawing Sheets

VEHICLE ROLL-ROD

CROSS-REFERENCE TO RELATED APPLICATIONS

The present application is based on, and claims priority from, Korean Application Serial Number 10-2003-0078671, filed on Nov. 7, 2003, the disclosure of which is hereby incorporated by reference herein in its entirety.

TECHNICAL FIELD

Generally, the present invention relates to a roll-rod for supporting the assembly of an engine and transmission to a vehicle body. More particularly, the present invention relates to a roll-rod adapted to suppress rolling of the engine-transmission assembly and support the engine-transmission assembly to the vehicle body.

BACKGROUND

Vehicles with a front engine and front-wheel-drive (FWD) typically have an engine of an engine-transmission assembly coupled to one side of the vehicle body via an engine mounting stopper. The transmission side of the engine-transmission assembly is often coupled to the other side of the vehicle body via a transmission mounting stopper. The engine-transmission assembly is also coupled to a cross-member of the vehicle body via a roll-rod.

A drawback of the typical roll-rod is that it does not effectively restrain rolling of the engine-transmission assembly in relation to the vehicle body. That is, the roll-rod should be capable of restraining slight rolling movements of the engine-transmission assembly during normal vehicle operation. The roll-rod should also be capable of restraining and attenuating large rolling movements of the engine-transmission assembly in the event an impact force is exerted on the vehicle during a rapid acceleration, sudden stop, or turning on/off the ignition key of the engine.

SUMMARY OF THE INVENTION

Embodiments of the present invention include a roll-rod configured, designed, and positioned to restrain and attenuate relatively little rolling movements of an engine-transmission assembly that occur while the vehicle is operated under normal driving conditions. The present invention also restrains and attenuates large rolling movements of the engine-transmission assembly in the event an impact force is exerted on the vehicle during a rapid acceleration, sudden stop, or turning on/off the ignition key of the engine.

A vehicle roll-rod includes a front insulator constituted by an inner pipe member, outer pipe member, and rubber member forcibly inserted therebetween. A rear insulator includes a case member and a plurality of rubber members. The case member is formed with flanges around its outer circumference. The plurality of rubber members are distantly located in the case member toward the anteroposterior direction of the vehicle. A rod is coupled at one end to the outer pipe member of the front insulator. The other end of the rod penetrates the rear insulator. A front stopper and rear stopper are distantly mounted on the rod from the rear insulator toward the anteroposterior direction of the vehicle. A middle stopper is disposed between the rubber members of the rear insulator and is affixed onto the rod.

BRIEF DESCRIPTION OF THE DRAWINGS

For a better understanding of the nature and objects of the present invention, reference should be made to the following detailed description taken in conjunction with the accompanying drawings, in which.

DETAILED DESCRIPTION OF THE PREFERRED EMBODIMENTS

Figure 1:
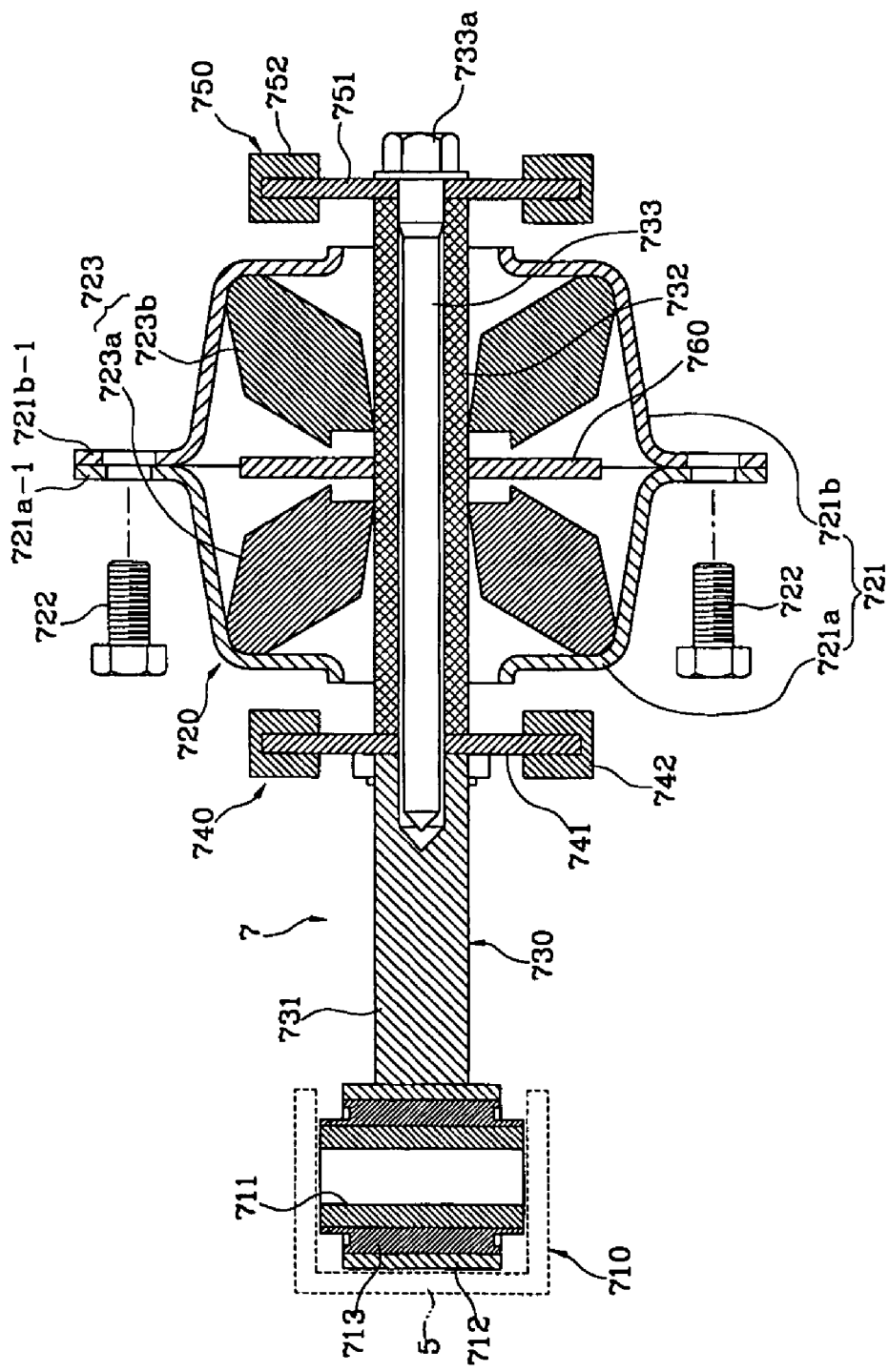
FIG. 1 is a cross-sectional view of a configuration of a vehicle roll-rod according to an embodiment of the present invention.

Referring now to FIG. 1, a vehicle roll-rod 7 is constituted by a front insulator 710, rear insulator 720, rod 730, front stopper 740, rear stopper 750, and middle stopper 760. The front insulator 710 includes an inner pipe member 711, outer pipe member 712, and rubber member 713 forcibly inserted therebetween. The front insulator 710 couples with a support bracket 5 via a coupling bolt penetrating the inner pipe member 711. The support bracket 5 typically couples with an engine-transmission assembly via a plurality of bolts, however, it will be appreciated by one of ordinary skill in the art that other coupling mechanisms will be equivalent and interchangeable. Thus, the front insulator 710 couples with the engine-transmission assembly via the support bracket 5.

The rear insulator 720 includes a case member 721 and a plurality of rubber members 723. The plurality of rubber members 723 are distantly located in the case member 721 toward the anteroposterior direction of the vehicle. The case member 721 is formed with flanges 721*a*-1 and 721*b*-1 around the outer circumference thereof. The case member 721 is constituted by a front case member 721*a* and rear case member 721*b* that are penetrated by the rod 730 and linearly slidably mounted on the rod 730.

The flanges 721*a*-1 and 721*b*-1 are formed at the outer circumference of the front case member 721*a* and rear case member 721*b*, respectively. When the flanges 721*a*-1 and 721*b*-1 of the front case member 721*a* and rear case member 721*b* are in contact with each other, the case member 721 is configured to be coupled to a cross-member of the vehicle body via a coupling bolt 722. The coupling bolt 722 penetrates the flanges 721*a*-1 and 721*b*-1 to be coupled with the cross-member.

The plurality of rubber members 723 inside the case member 721 is constituted by a front rubber member 723*a* and rear rubber member 723*b*. The front rubber member 723*a* has a donut-shaped configuration and is installed inside the front case member 721*a* around the periphery of the rod 730. The rear rubber member 723*b* has a donut-shaped configuration and is installed inside the rear case member 721*b* around the periphery of the rod 730. As illustrated in the drawing, the peripheries of the front and rear rubber members 723*a* and 723*b* couple by vulcanization with the inner boundary lines of the front and rear case members 721*a* and 721*b*. The inner circumferences of the front rubber member 723*a* and rear rubber member 723*b* are not affixed onto but are merely supported by the rod 730.

One end of the rod 730 is coupled, for example, by welding, to the outer pipe member 712 of the front insulator 710, however, it will be appreciated by one of ordinary skill in the art that other coupling mechanisms will be equivalent. The other end of the rod 730 penetrates the rear insulator 720. That is, the rod 730 is constituted by a connecting member 731, connecting pipe member 732 and connecting bolt 733. The connecting member 731 is coupled at one end thereof, for example, by welding, to the outer pipe member 712 of the front insulator 710. The connecting pipe member 732 penetrates the rear insulator 720. The connecting bolt 733 penetrates the connecting pipe member 732 to couple with the connecting member 731. Thus, the connecting bolt 733 couples the connecting member 731 and connecting pipe member 732.

The front stopper 740 is fixed onto the rod 730 distant from the rear insulator 720 and toward the front of the vehicle. The front stopper 740 includes a front plate member 741 placed between the connecting member 731 and connecting pipe member 732 by the coupling force of the connecting bolt 733. A front plate rubber member 742 is attached by vulcanization around the periphery of the front plate member 741.

The rear stopper 750 is secured onto the rod 730 distant from the rear insulator 720 and toward the rear of the vehicle. The rear stopper 750 includes a rear plate member 751 placed between the connecting pipe member 732 and a bolt head 733*a* of the connecting bolt 733 by the coupling force of the connecting bolt 733. A rear plate rubber member 752 is attached by vulcanization around the periphery of the rear plate member 751.

The middle stopper 760 is located between the front rubber member 723*a* and rear rubber member 723*b* in the case member 721. The middle stopper 760 is preferably a middle plate member integrally coupled to the periphery of the connecting pipe member 732.

Figure 2:
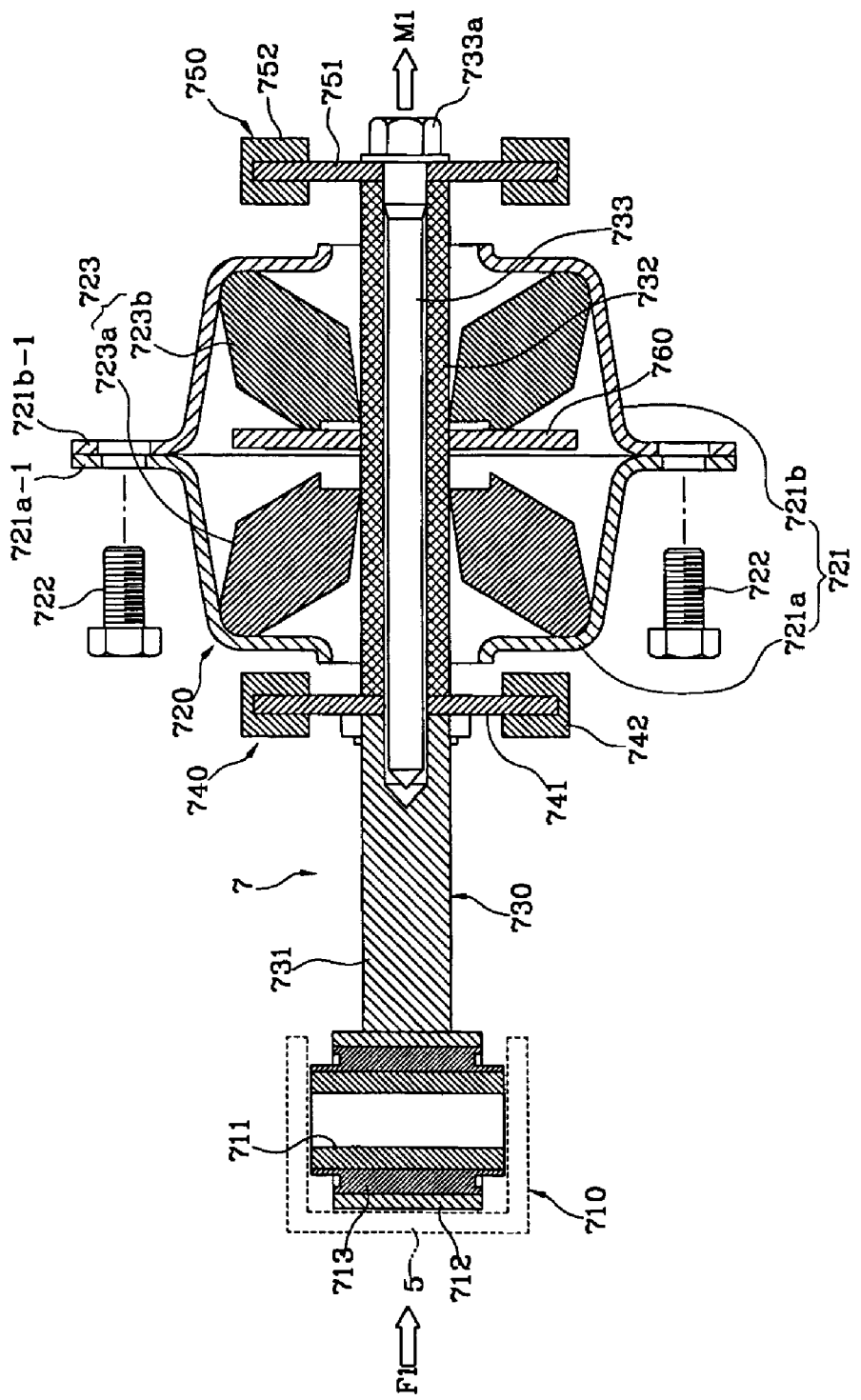
FIGS. 2 and 3 illustrate vibration insulation states of a vehicle roll-rod during a gradual acceleration and rapid acceleration, respectively, according to an embodiment of the present invention.

Under normal driving conditions or when the vehicle is at idle, vibration of the engine-transmission assembly is unnoticeably produced. Thus, the vehicle roll-rod 7 according to the embodiment of the present invention can isolate vibration and shock by a buffering action of the front and rear rubber members 723*a* and 723*b*. When the vehicle accelerates gradually, the forward movement of the vehicle shifts the engine-transmission assembly toward the rear of the vehicle. The vehicle roll-rod 7, as shown in FIG. 2, similarly receives a force to shift it toward the rear of the vehicle body, as depicted as F1. Thus, the front insulator 710, rod 730, front stopper 740, rear stopper 750, and middle stopper 760 move toward the rear of the vehicle body in the direction of the arrow M1. Therefore, the force of impact and vibration that occurs when the vehicle gradually speeds up are sufficiently insulated by the buffering action via the rear rubber member 723*b* when the middle stopper 760 contacts the rear rubber member 723*b*.

Figure 3:
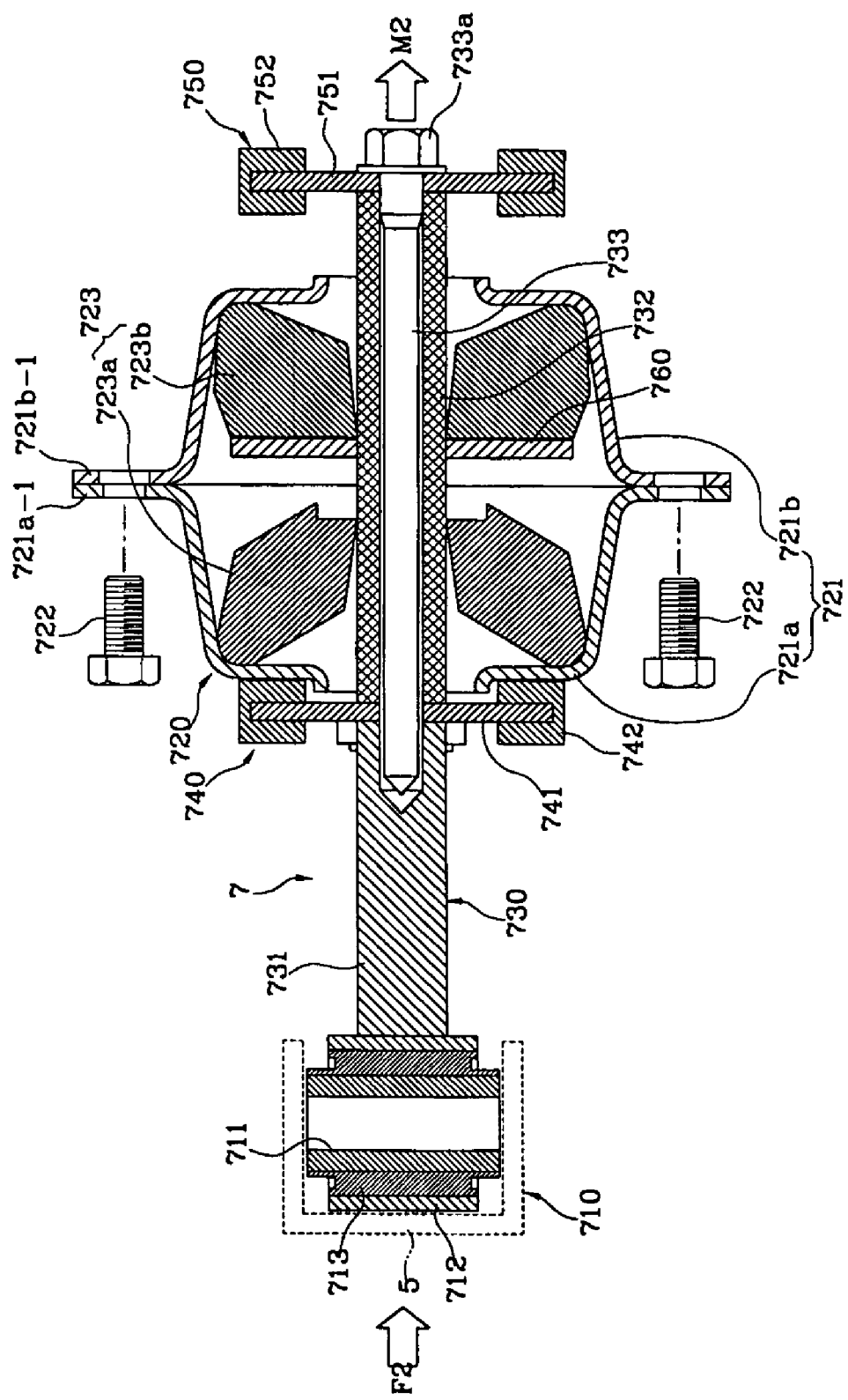

If the vehicle accelerates rapidly, the shifting force of the engine-transmission assembly is greater than the shifting force of a vehicle that accelerates gradually, thus enabling the vehicle roll-rod 7 to receive a greater force, depicted as F2 and as shown in FIG. 3. Therefore, the front insulator 710, rod 730, front stopper 740, rear stopper 750, and middle stopper 760 move further away to the rear of the vehicle body as delineated in arrow M2. Accordingly, a great force of impact and vibration generated when the vehicle rapidly accelerates are insulated by buffering effects of the rear rubber member 723*b* and front plate rubber member 742. That is, the rear rubber member 723*b* performs the buffering action when the middle stopper 760 pressurizes the rear rubber member 723*b* within a large force, whereas the front plate rubber member 742 executes the buffering action when the front plate rubber member 742 of the front stopper 740 contacts the front case member 721*a*. In short, in the event of a rapid acceleration of the vehicle, the great force of impact and vibration are effectively isolated by a double buffering action performed by the rear rubber member 723*b* and front plate rubber member 742.

Figure 4:
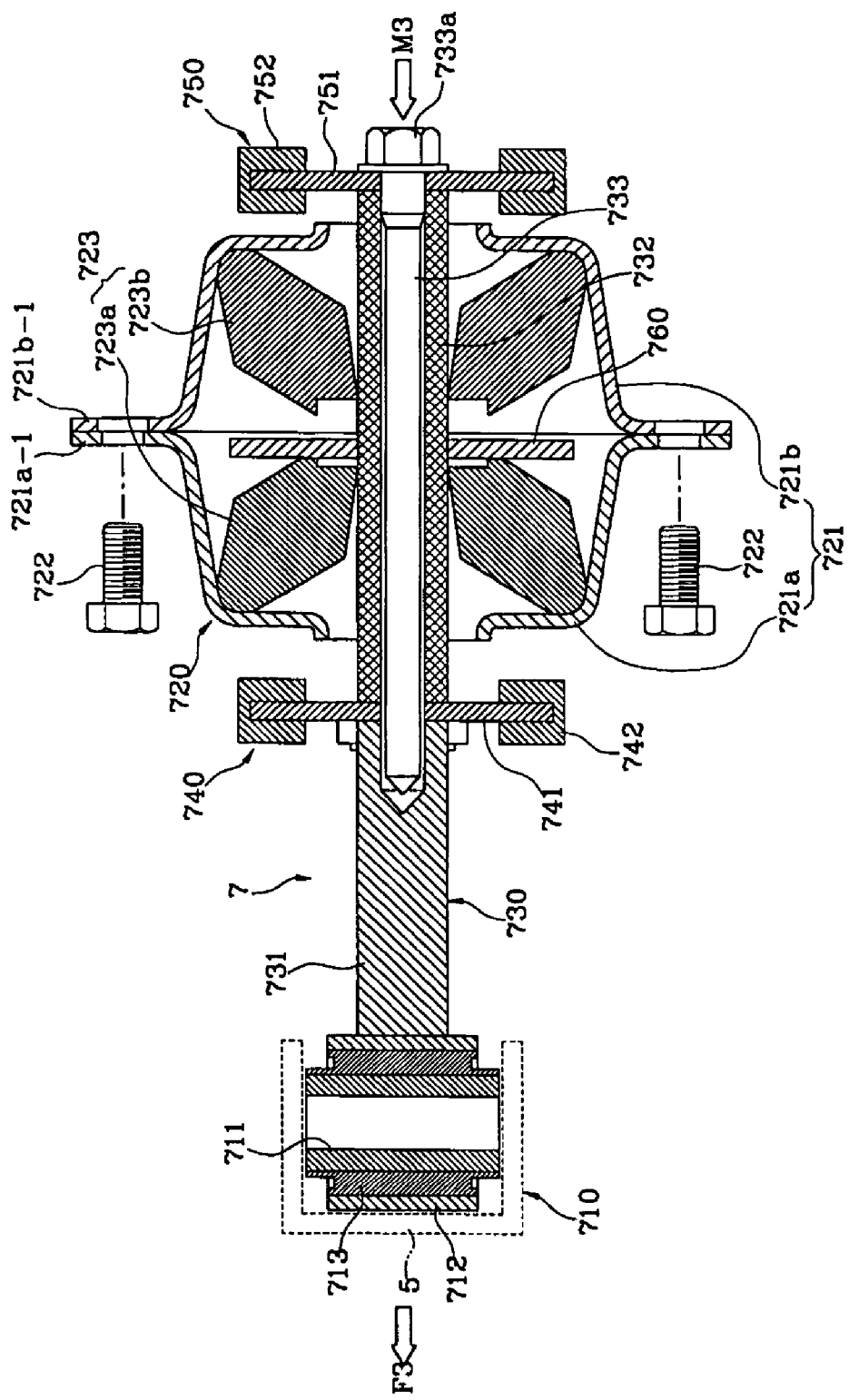
FIGS. 4 and 5 illustrate vibration insulation states of a vehicle roll-rod during a gradual stop and sudden stop, respectively, according to another embodiment of the present invention.

Provided that the vehicle stops gradually under a normal condition, the engine-transmission assembly receives a force that tends to shift it toward the front of the vehicle body. The vehicle roll-rod 7, according to an embodiment of the present invention, receives a force that shifts it toward the front of the vehicle body, illustrated by arrow F3 in FIG. 4, such that the front insulator 710, rod 730, front stopper 740, rear stopper 750, and middle stopper 760 move toward the front of the vehicle body in the direction of arrow M3. The impact and vibration generated while the vehicle makes a gradual stop are insulated by a buffering action performed by the front rubber member 723*a* when the middle stopper 760 contacts the front rubber member 723*a*.

Figure 5:
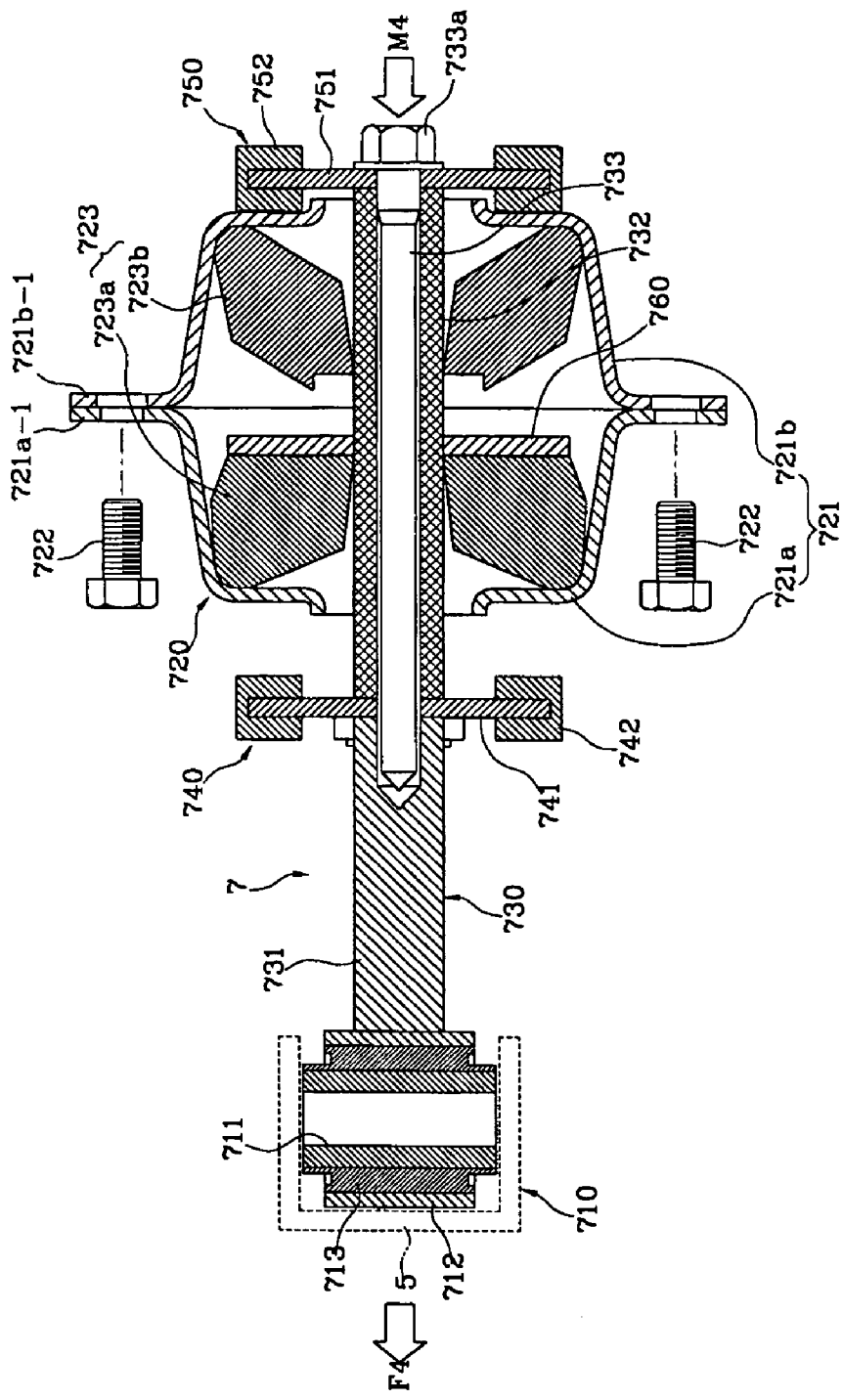

If the vehicle makes a sudden stop, the shifting force of the engine-transmission assembly is greater than that of the gradual stop. The vehicle roll-rod 7, according to another embodiment of the present invention, receives a larger force, shown as arrow F4 of FIG. 5. Thus, the front insulator 710, rod 730, front stopper 740, rear stopper 750, and middle stopper 760 move further away toward the front of the vehicle body as illustrated in arrow M4. Accordingly, a large impact and vibration generated when the vehicle makes a sudden stop is isolated by buffering actions of the front rubber member 723*a* and rear plate rubber member 752. The front rubber member 723*a* performs the buffering action when the middle stopper 760 pressurizes the front rubber member 723*a* within a large force, whereas the rear plate rubber member 752 executes the buffering action when the front plate rubber member 752 of the rear stopper 750 contacts the rear case member 721*b*. In short, if the vehicle stops suddenly, a large impact and vibration are effectively isolated by a double buffering action performed via the front rubber member 723*a* and rear plate rubber member 752.

The vehicle roll-rod operation during a rapid acceleration or sudden stop can identically be applied to a large impact and vibration upon turning on or off the ignition key of the engine or when the vehicle makes a sharp turn. Consequently, the vehicle roll-rod 7 according to an embodiment of the present invention effectively minimizes impact and vibration, generated by rolling of the engine-transmission assembly in relation to the vehicle body, from being transmitted toward the vehicle body, thereby improving a Noise Vibration Harshness (NVH) property in a vehicle installed with the vehicle roll-rod 7.

As apparent from the foregoing, there is an advantage in that the roll-rod is capable of restraining and attenuating rolling of relatively small movements occurring in normal driving. The roll-rod also restrains and dampens rolling of large movements with regard to major forces of impact upon a rapid acceleration, sudden stop, or turning on/off the ignition key of the engine.

What is claimed is:
1. A vehicle roll-rod, comprising:
a front insulator including an inner pipe member, an outer pipe member, and a rubber member forcibly inserted therebetween;
a rear insulator including a case member and a plurality of rubber members, said case member being equipped with flanges around a outer circumference thereof; and said plurality of rubber members being located in said case member;

a rod whose one end is coupled to said outer pipe member of said front insulator, and the other end of said rod penetrates said rear insulator; and a front stopper and a rear stopper distantly installed on said rod from said rear insulator toward the anteroposterior direction of the vehicle, and a middle stopper disposed between said rubber members of said rear insulator and fixed on said rod;

wherein said rod comprises:
- a connecting member coupled at one end thereof to said outer pipe member of said front insulator;
- a connecting pipe member penetrating said rear insulator; and
- a connecting bolt penetrating said connecting pipe member to couple with said connecting member to thereby couple said connecting member and said connecting pipe member;

said front stopper includes a front plate member placed between said connecting member and said connecting pipe member by the coupling force of said connecting bolt, and a front plate rubber member installed along the periphery of said front plate member;

said rear stopper includes a rear plate member placed between said connecting pipe member and a bolt head of said connecting bolt, and a rear plate rubber member is installed along the periphery of said rear plate member; and said middle stopper includes a middle plate member integrally coupled to the periphery of said connecting pipe member and located between said rubber members in said case member.

2. The roll-rod as defined in claim 1, wherein said case member comprises a front case member and a rear case member linearly slidably mounted on said rod, and coupling bolts penetrate said flanges formed at said front case member and said rear case member.

3. The roll-rod as defined in claim 1, wherein said plurality of rubber members in said case member comprises:
- a front rubber member having a donut-shaped configuration and installed inside said front case member around the periphery of said rod; and
- a rear rubber member having a donut-shaped configuration and installed inside said rear case member around the periphery of said rod.

4. A vehicle roll-rod, comprising:
- a front insulator including an inner pipe member, an outer pipe member, and a rubber member positioned therebetween;
- a rear insulator including a case member and a plurality of rubber members, wherein said case member is equipped with flanges around a outer circumference and wherein said plurality of rubber members are positioned in said case member;
- a rod having one end coupled to said outer pipe member of said front insulator and wherein the other end of said rod penetrates said rear insulator; and
- a front stopper and a rear stopper installed on said rod distant from said rear insulator, and a middle stopper disposed between said rubber members of said rear insulator and positioned on said rod;

wherein said rod comprises:
- a connecting member coupled at one end thereof to said outer pipe member of said front insulator; and
- a connecting pipe member penetrating said rear insulator, wherein said connecting pipe is coupled with said connecting member;

said front stopper includes a front plate member placed between said connecting member and said connecting pipe member, and a front plate rubber member installed along the periphery of said front plate member;

said rear stopper includes a rear plate member coupled thereto, and a rear plate rubber member installed along the periphery of said rear plate member; and said middle stopper includes a middle plate member integrally coupled to the periphery of said connecting pipe member and located between said rubber members in said case member.

5. The roll-rod as defined in claim 4, wherein said case member comprises a front case member and a rear case member linearly slidably mounted on said rod.

6. The roll-rod as defined in claim 4, wherein said plurality of rubber members in said case member comprises:
- a front rubber member being installed inside said front case member around the periphery of said rod; and
- a rear rubber member being installed inside said rear case member around the periphery of said rod.

* * * * *